Feb. 25, 1947.　　　W. J. CHADDER　　　2,416,377
PURIFICATION OF AROMATIC HYDROCARBONS BY AZEOTROPIC DISTILLATION
Filed Dec. 6, 1943　　　2 Sheets-Sheet 1
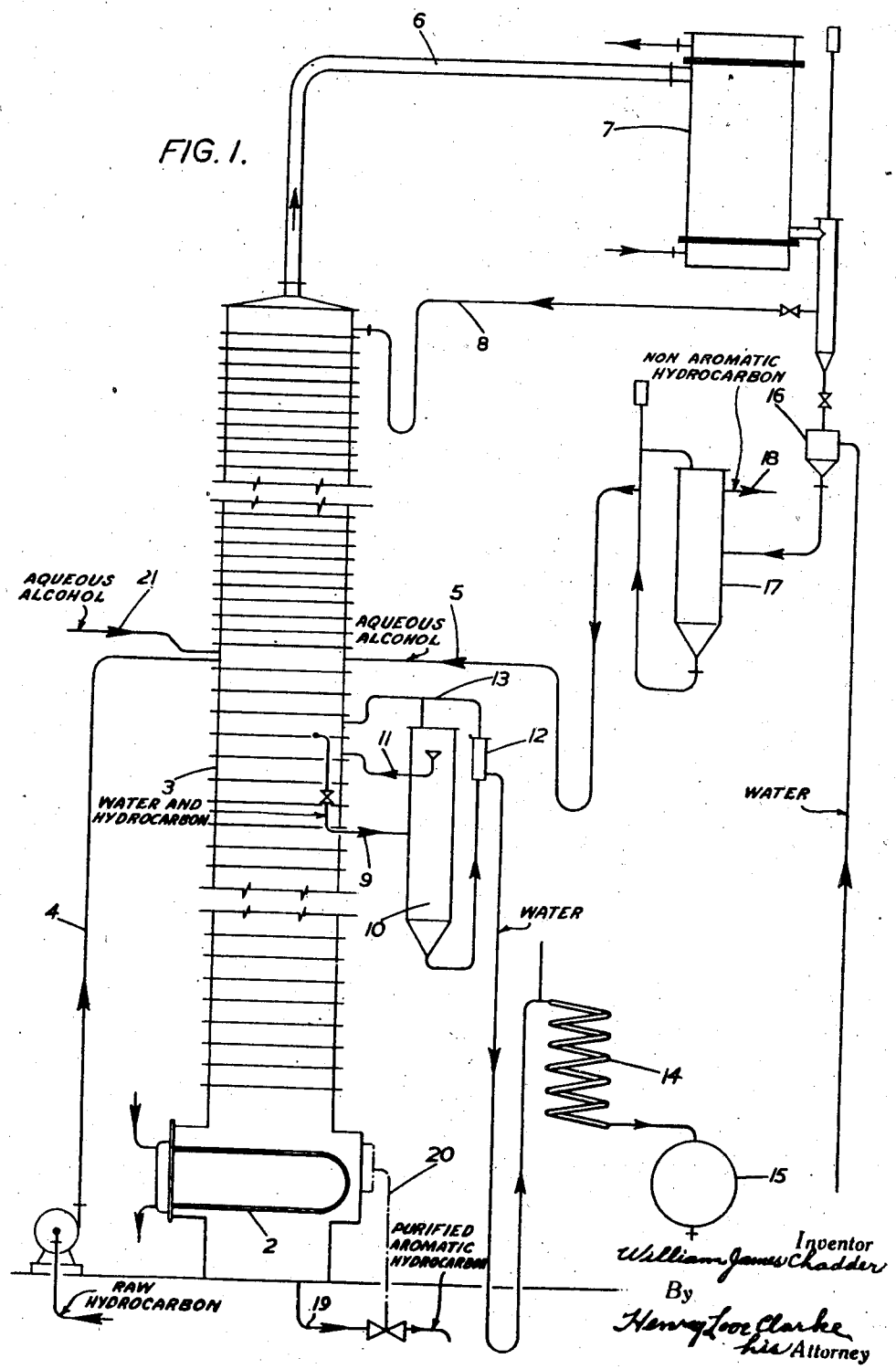
FIG. I.

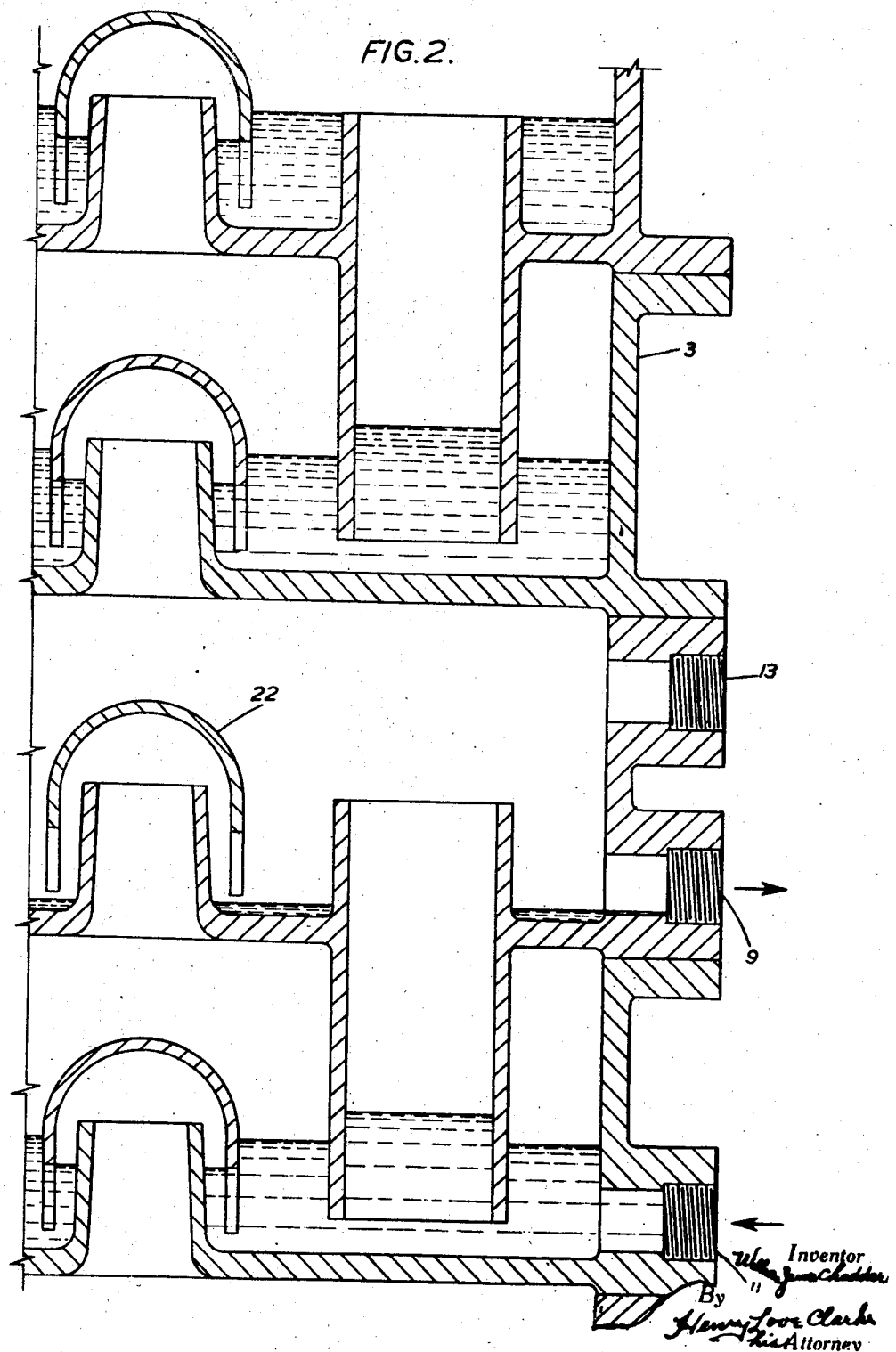

Patented Feb. 25, 1947

2,416,377

UNITED STATES PATENT OFFICE 2,416,377

PURIFICATION OF AROMATIC HYDROCARBONS BY AZEOTROPIC DISTILLATION

William James Chadder, Guildford, England, assignor, by mesne assignments, to Koppers Company, Inc., Pittsburgh, Pa., a corporation of Delaware Application December 6, 1943, Serial No. 513,091
In Great Britain March 19, 1943

5 Claims. (Cl. 202—42)

This invention relates to an improvement in or a modification of the process of United States patent application Serial No. 476,176, now Patent 2,386,755, granted October 16, 1945, (hereinafter referred to as "the parent process").

In the parent process, undesired non-aromatic hydrocarbons are removed from a mixture containing the same with an aromatic hydrocarbon boiling below 150° C. by distilling the mixture in a fractionating column with a two-component entraining agent consisting of a lower aliphatic alcohol such as methanol and water; the mixture of hydrocarbons and entraining agent is fed at a suitable intermediate level into the column, the purified aromatic hydrocarbon and the water are withdrawn from the lower part of the column, the water is recovered and is added to the distillate (comprising the non-aromatic hydrocarbons and the alcohol) withdrawn from the top of the column to effect the separation from the distillate of the bulk of the non-aromatic hydrocarbons, the latter are separated and the mixture of alcohol and water is returned to the column at or closely adjacent to the place of entry of the raw material to be purified. Preferably, in the parent process the quantity of water maintained in circulation is such that it is no greater than the amount necessary to cause the separation of the bulk of the non-aromatic hydrocarbons from the top distillate.

According to the present invention, the parent process is modified in the following manner: the total quantity of hydrocarbons and water descending the fractionating column below the level of entry thereto of the raw material and entraining agent is withdrawn from the column at a level where the water is substantially free from alcohol, the water is separated from the hydrocarbons and the hydrocarbons are returned to the column immediately below the level of withdrawal of the water and hydrocarbons, and the separated water is then used to effect the separation of the non-aromatic hydrocarbons from the top distillate as in the parent process and to obtain a two-component entraining agent which is returned to the column with the raw material.

A suitable apparatus for applying the present invention in practice is shown by way of example in the accompanying drawings, in which Figure 1 is a diagrammatic view of the components and the pipe-lines and Figure 2 is an enlarged vertical section of the fractionating column at the zone where hydrocarbons and water are removed from the column to separate water therefrom.

Referring to Figure 1, which shows apparatus for carrying out the process of the parent application, the raw hydrocarbon mixture is fed to the fractionating column 3 by the pipe line 4. The column 3 is heated at its base by the steam coil 2.

A two-component entraining agent, consisting of a mixture of methyl alcohol containing about 15–20% water according to the parent process is supplied to the column at 5. The non-aromatic hydrocarbons together with the methyl alcohol are withdrawn as vapour by the pipe 6 and the mixture is condensed in condenser 7, a proportion of the condensate being returned at 8 as reflux liquid to the column.

At a short distance below the level of entry of the raw material and entraining agent to the fractionating column, the water (which descends the column with the aromatic hydrocarbon) will have become substantially completely separated from the methyl alcohol, the latter ascending the column with the non-aromatic hydrocarbons. The particular plate of the column at which the water is practically free from alcohol can be ascertained in any individual column and for any given set of operating conditions by a simple test on samples of the liquid withdrawn from various plates through suitable test outlets of known design which may be provided on the column plates.

An outlet 9 is provided to drain practically all the liquid from that plate of the column 3 where the water becomes substantially free from alcohol. The water and hydrocarbon mixture is led to a separator 10, from which the hydrocarbons are returned to the next lower plate of the column 3 by the pipe 11. The water is removed from the separator at the appropriate rate over the adjustable weir 12. A pressure-equalizing connection 13 is provided between the column 3, the separator 10 and the water offtake 12.

The hot water, practically free from alcohol and aromatic hydrocarbon, withdrawn at 12 is passed through the cooler 14 to the small reservoir tank 15, from which it is pumped to the mixing tank 16. Here the water is mixed with the condensate from condenser 7; the mixture separates into two phases, i. e. an aqueous phase containing the water and the greater part of the alcohol, and a hydrocarbon phase containing the non-aromatic hydrocarbons together with a very minor amount of dissolved alcohol. The phases are separated in the separator 17, from which the aqueous alcohol is returned to the column 3 as the entraining agent through the pipe 5, while the non-aromatic hydrocarbons are withdrawn at 18 and can if desired be further treated according to the parent process.

The aromatic hydrocarbon free from non-aromatic hydrocarbons, water and alcohol, is withdrawn from the bottom of the column at 19. A liquid level controller 20 can be provided to maintain the correct volume of liquid in the heater section of the column.

Any make-up alcohol and water required are supplied to the column at 21.

Figure 2 shows an enlarged view of the connections 9, 11 and 13 to the column 3. It will be noted that the outlet for the hydrocarbons and water is arranged practically from the base of the plate so that there is a free passage for the ascending vapours through the bubble caps 22, and that the pressure-equalizing connection 13 is made to the same plate. The function of the part of the column below inlet 11 is to ensure exclusion from the bottom product of any alcohol and water which may be returned with the hydrocarbons to the column at point 11 from the separator 10.

The elimination from the column 3 of the descending water as soon as it is substantially free from alcohol constitutes the distinction between the present invention and that of application Serial No. 476,176 in which the water descends to the base of the column with the aromatic component and is withdrawn with the latter prior to separation therefrom. The present invention shows three advantages over the method and apparatus of application Serial No. 476,176. These are:

1. That the disadvantages of having to deal with a 2-phase (water-hydrocarbon) mixture on the plates of the column below inlet 11 are now avoided. The plates in this section of the column may be of conventional design, and special plates of the type required for dealing with 2-phase mixtures are unnecessary; hence the column construction is simplified and cheapened.

2. The stratification of hydrocarbons and water which may occur at the bottom of the column in the apparatus of application Serial No. 476,176 and which gives rise to a risk of water or hydrocarbon surging intermittently into and flooding the bottom of the separator is eliminated in the present apparatus. Only hydrocarbons, with the present apparatus, reach the bottom of the column, and the construction and design of the heater 2 is accordingly simplified and cheapened.

3. Any water present in or entrained with the returned hydrocarbons due to incomplete separation in the separator 10 is effectively eliminated by evaporation in the present arrangement, whereas in the apparatus of application Serial No. 476,176 there is a risk of water and contamination of the bottom product owing to incomplete separation in the lower separator.

What I claim is:

1. A process for the separation of an aromatic hydrocarbon from admixture with non-aromatic hydrocarbons boiling up to about 15° higher than the boiling point of the aromatic hydrocarbon, comprising: distilling the hydrocarbon mixture in a fractionating column with a 2-component entraining agent composed of a monohydric alcohol and water, distilling overhead monohydric alcohol with the non-aromatic hydrocarbons, passing the water with the aromatic hydrocarbon downwardly through the column, controlling the amount of entraining agent added so that the aromatic hydrocarbon descending with water is withdrawn from the column below the point of entry of the hydrocarbon mixture, said point of withdrawal being such that substantially none of the component of the entraining agent which distills overhead with the non-aromatic hydrocarbons is present, withdrawing the aromatic hydrocarbon with the descending component of the entraining agent from the column, separating said component from the aromatic hydrocarbon and returning the aromatic hydrocarbon to the column at a point immediately below the level of its withdrawal, continuing the distillation of the aromatic hydrocarbon in the bottom of the column and withdrawing from the base of the column aromatic hydrocarbons free of non-aromatic hydrocarbons and both components of the entraining agent.

2. A process as claimed in claim 1, characterized in this, that the component of the entraining agent which descends in the column is admixed after its separation from the hydrocarbons with the mixture of the non-aromatic hydrocarbons and the other component of the entraining agent withdrawn as the top distillate from the column to effect the substantial separation of the non-aromatic hydrocarbons therefrom and to produce thereby a two-component entraining agent which is returned to the column with the initial hydrocarbon mixture.

3. A process for the separation of an aromatic hydrocarbon boiling below 150° C. from admixture with non-aromatic hydrocarbons boiling up to about 15° higher than the boiling point of the aromatic hydrocarbon comprising: distilling the mixture in a fractionating column with a 2-component entraining agent consisting of an aliphatic alcohol containing not more than three carbon atoms in the molecule and water, the quantity of entraining agent added to the mixture being such that the water will become substantially free of alcohol as the mixture descends in the column, withdrawing from the column the mixture of aromatic hydrocarbon and water at a point closely adjacent that at which the water becomes free of alcohol, separating the water from the hydrocarbons, returning the hydrocarbons to the column immediately below the point of withdrawal of the water and hydrocarbons and withdrawing from the base of the column the aromatic hydrocarbon from which the water and non-aromatic hydrocarbons having boiling points up to about 15° higher than the boiling point of the aromatic hydrocarbon have been separated by distillation.

4. A process as claimed in claim 3, characterized in this, that the separated water is admixed with the mixture of non-aromatic hydrocarbons and alcohol withdrawn as the top distillate to effect the substantial separation of the non-aromatic hydrocarbons therefrom and to produce a two-component entraining agent comprising the alcohol and water which is returned to the column with the initial hydrocarbon mixture.

5. Apparatus for effecting the separation of the components of a hydrocarbon mixture, including a fractionating column, a first liquid separating device for separating immiscible liquids, and a second liquid separating device for separating immiscible liquids, an inlet at an intermediate level of the column for the admission thereto of the hydrocarbon mixture, an outlet from the column below the said inlet for withdrawing the total quantity of liquid descending the column, said outlet being connected to the first liquid separating device, a connection from the said first liquid separating device for returning one of the separated liquid components to the column at a level immediately below the level of the said outlet, a condenser for the vapours leaving the top of the fractionating column, a connection between said condenser and said second liquid separating device, a connection to admix the other liquid component separated in the first liquid separating device with the liquid from the condenser reaching said second liquid separating device, and a connection between the bottom of the second separator and the intermediate feed level of the column for leading the heavier component separated in said second liquid separating device back to the fractionating column.

WILLIAM JAMES CHADDER.

REFERENCES CITED

The following references are of record in the file of this patent:

UNITED STATES PATENTS

| Number | Name | Date |
|---|---|---|
| 2,319,694 | Lee et al. | May 18, 1943 |
| 2,332,493 | Petry et al. | Oct. 19, 1943 |
| 2,342,145 | Isham et al. | Feb. 22, 1944 |
| 1,587,188 | Schneible | June 1, 1926 |
| 2,376,870 | Engel | May 29, 1945 |
| 2,360,655 | Deanesly | Oct. 17, 1944 |

FOREIGN PATENTS

| Number | Country | Date |
|---|---|---|
| 513,566 | British | Nov. 16, 1939 |
| 831,295 | French | May 30, 1938 |